US007333464B2

(12) United States Patent
Yang et al.

(10) Patent No.: US 7,333,464 B2
(45) Date of Patent: Feb. 19, 2008

(54) AUTOMATED SERVICE DISCOVERY AND WIRELESS NETWORK SET-UP

(75) Inventors: Fan Yang, Jiang Su (CN); Junfeng Zhou, Beijing (CN); Kun Tan, Beijing (CN); Qian Zhang, Kowloon (HK)

(73) Assignee: Microsoft Corporation, Redmond, WA (US)

( * ) Notice: Subject to any disclaimer, the term of this patent is extended or adjusted under 35 U.S.C. 154(b) by 101 days.

(21) Appl. No.: 11/275,863

(22) Filed: Feb. 1, 2006

(65) Prior Publication Data

US 2007/0177554 A1 Aug. 2, 2007

(51) Int. Cl.
*H04Q 7/24* (2006.01)

(52) U.S. Cl. .................. 370/338; 370/328; 370/278; 370/392; 370/252; 709/221; 709/226; 709/228; 455/41.2; 455/414.1

(58) Field of Classification Search ............. 370/338, 370/328, 392, 278; 709/226, 228, 221; 455/414.1, 41.2, 414.2
See application file for complete search history.

(56) References Cited

U.S. PATENT DOCUMENTS

| | | | |
|---|---|---|---|
| 6,598,094 B1 * | 7/2003 | Wollrath et al. ............ 719/330 |
| 6,665,269 B1 * | 12/2003 | Schmitz .................... 370/251 |
| 6,665,611 B1 * | 12/2003 | Oran et al. ................. 701/213 |
| 6,693,888 B2 * | 2/2004 | Cafarelli et al. ............ 370/338 |
| 6,744,753 B2 * | 6/2004 | Heinonen et al. .......... 370/338 |
| 6,768,721 B1 * | 7/2004 | Schmitz et al. ............. 370/248 |
| 6,792,323 B2 * | 9/2004 | Krzyzanowski et al. ...... 700/90 |
| 6,909,721 B2 * | 6/2005 | Ekberg et al. ............... 370/401 |
| 6,922,548 B1 * | 7/2005 | Moore et al. .............. 455/41.2 |
| 6,931,429 B2 * | 8/2005 | Gouge et al. ............... 709/203 |
| 6,944,430 B2 * | 9/2005 | Berstis .................... 455/186.1 |
| 6,944,679 B2 * | 9/2005 | Parupudi et al. ............ 709/246 |
| 6,961,310 B2 * | 11/2005 | Cain .......................... 370/238 |
| 7,016,948 B1 * | 3/2006 | Yildiz ....................... 709/221 |
| 7,050,815 B2 * | 5/2006 | I'Anson et al. .......... 455/456.1 |
| 7,076,255 B2 * | 7/2006 | Parupudi et al. ......... 455/456.1 |
| 7,088,687 B2 * | 8/2006 | Ayyagari et al. ............ 370/278 |
| 7,103,313 B2 * | 9/2006 | Heinonen et al. .......... 455/41.2 |
| 7,103,351 B2 * | 9/2006 | Chaudhari et al. ....... 455/414.1 |

(Continued)

OTHER PUBLICATIONS

Borisov, N. et al., "Intercepting Mobile Communications: The Insecurity of 802.11", MOBICOM, 2001, pp. 108-188.

(Continued)

*Primary Examiner*—Marceau Milord
(74) *Attorney, Agent, or Firm*—Lee & Hayes, PLLC

(57) ABSTRACT

The present technique for automating service discovery and the set-up of a wireless network improves a user's experience when setting-up the wireless network and using one or more services. The technique includes automatic neighbor/service discovery using special beacons transmitted from wireless devices. Each special beacon identifies the wireless device (i.e., host) that transmitted the beacon along with the services provided by the device. For each special beacon that is received, a corresponding host name and the service provided by it are displayed in a graphical user interface. A user may select one or more of the host names and initiate a transmission of a network set-up and service request. The network set-up and service request identifies the selected host names and invites each selected host name to become a member of a wireless network. After the network has been set up, the service may be invoked automatically.

24 Claims, 8 Drawing Sheets

U.S. PATENT DOCUMENTS

| | | | |
|---|---|---|---|
| 7,139,569 B2* | 11/2006 | Kato .................... | 455/432.3 |
| 7,146,433 B2* | 12/2006 | Cromer et al. ............ | 709/239 |
| 7,151,764 B1* | 12/2006 | Heinonen et al. .......... | 370/338 |
| 7,177,940 B1* | 2/2007 | Holan et al. .............. | 709/231 |
| 7,188,182 B2* | 3/2007 | Andrew et al. ............ | 709/228 |
| 7,194,263 B2* | 3/2007 | Bahl et al. ............... | 455/432.1 |
| 7,194,354 B1* | 3/2007 | Oran et al. ............... | 701/207 |
| 7,213,048 B1* | 5/2007 | Parupudi et al. ........... | 709/203 |
| 7,225,253 B2* | 5/2007 | Ofir et al. ................ | 709/224 |
| 7,254,119 B2* | 8/2007 | Jiang et al. ............... | 370/328 |
| 7,284,062 B2* | 10/2007 | Krantz et al. ............. | 709/229 |

OTHER PUBLICATIONS

Ceglowski, M., "Using Bloom Filters", Avaliable at http://www.perl.com/pub/a/2004/04/08/bloom_filters.html, Apr. 2004, pp. 1-8, retrieved on Feb. 7, 2006.

Chen, J.C. et al., "Wireless LAN Security and IEEE 802.11i", IEEE Wireless Communications, Feb. 2005, pp. 1-19.

"Part 11: Wireless LAN Medium Access Control (MAC) and Physical Layer (PHY) Specifications", ANSI/IEEE 802.11 Standard, 1999 Edition (R2003), pp. i-ii, 46, 48, 49, 55, 123, 125, 126.

Johnson, D. et al., "Dynamic Source Routing in Ad Hoc Wireless Networks", Mobile Computing, edited by T. Imielinski and H. Korth, 1996, pp. 153-181, Chapter 5, Kluwer Academic Publishers.

Perkins, C. et al., "Ad Hoc On-Demand Distance Vector (AODV) Routing", RFC 3561, Jul. 2003, pp. 1-34.

Perkins, C. E. et al., "IP Address Autoconfiguration for Ad Hoc Networks", IETF Internet Draft, Nov. 2001, pp. i, 1-13.

"Public Key Infrastructure", Available at http://en.wikipedia.org/wiki/PKI, pp. 1-5, retrieved on Feb. 7, 2006.

WI-FI Alliance, "Wi-Fi Protected Access: Strong, standards-based, interoperable security for today's Wi-Fi networks", Available at http://www.wifialliance.com/OpenSection/pdf/Whitepaper_Wi-Fi_Security 4-29-03.pdf, 2003, pp. i-7.

* cited by examiner

800 — NEGOTIATION POLICY

| CASE # | DEVICE # | MODE a | MODE b | MODE g | SELECTED MODE |
|---|---|---|---|---|---|
| 802 | 1 | X | | | No Mode Available |
| | 2 | | X | X | |
| 804 | 1 | | X | X | Mode b |
| | 2 | | X | | |
| 806 | 1 | X | X | X | Mode b |
| | 2 | | X | | |
| 808 | 1 | X | X | X | Mode a |
| | 2 | X | | | |
| 810 | 1 | X | X | X | Mode a |
| | 2 | X | X | X | |
| 812 | 1 | | X | X | Mode g |
| | 2 | | X | X | |

*Fig. 8*

AUTOMATED SERVICE DISCOVERY AND WIRELESS NETWORK SET-UP

BACKGROUND

Wireless networks are becoming more widely available. Most laptop computers, desktop computers, and handheld devices are equipped with wireless network interface cards. Typically, information technology (IT) professionals or other skilled persons configure these computing devices for wireless access. The configuration process is mostly manual and requires the exchange of configuration information by word-of-mouth in order to set up the wireless network.

For users who do not understand the terminology and/or have little knowledge about wireless and networking technology, this manual method of setting-up wireless networks is very inconvenient and sometimes difficult. It may require repeated attempts by the users to obtain the correct information. In addition, the users may be inconvenienced if the IT professional is not immediately available to help set up the wireless network. In addition, even after a user becomes aware of the availability of a wireless network, the user may not know what services (e.g., Internet access, peer to peer gaming, or file sharing) are available.

SUMMARY

The present technique for automating the service discovery and set-up of a wireless network enables service discovery before joining or setting-up the wireless network. This improves a user's experience when setting-up the wireless network. The technique includes automatic neighbor/service discovery using special beacons transmitted from wireless devices. Each special beacon identifies the wireless device (i.e., host) that transmitted the beacon as well as a service provided by the wireless device. For each special beacon that is received, a corresponding host name along with the provided service is displayed in a graphical user interface. A user may select one or more of the host names and initiate a transmission of a network set-up request. The network set-up request identifies the selected host names and invites each selected host name to become a member of a wireless network. After the wireless network is set-up, a service may be automatically invoked for the user who initiated the set-up procedure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 8 is a table illustrating an exemplary negotiation policy for selecting a mode for communicating between two or more wireless computing devices.

DETAILED DESCRIPTION

The following description is directed at an automated wireless service discovery and network set-up technique. The automated wireless service discovery and network set-up technique improves a user's experience when setting-up a wireless network and utilizing a service provided through the wireless network. In overview, the technique utilizes a special beacon for automatic neighbor and service discovery and for automated wireless network set-up. As will be described below, the present automated wireless service discovery technique allows a user to determine whether and with whom to set-up a wireless network. Once it is determined to set-up a wireless network, the automated wireless network set-up technique allows a wireless network to be created by a user with minimal networking knowledge or skill.

Figure 1:
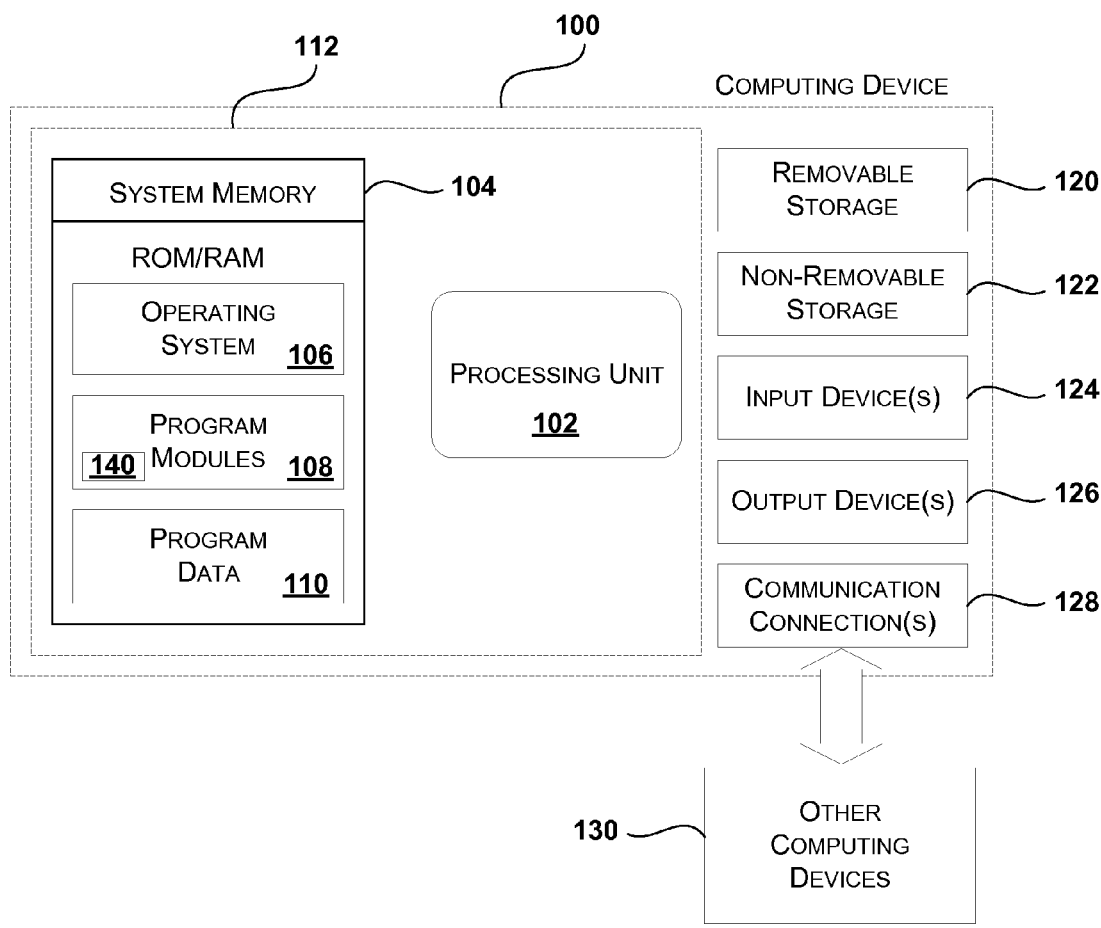
FIG. 1 is an illustrative computing device that may be used to implement the automated wireless service discovery and network set-up technique described herein.

FIG. 1 is an illustrative computing device that may be used to implement the automated wireless service discovery and network set-up technique described herein. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. For the present automated wireless network set-up technique, the program modules 108 may include one or more components 140 for implementing the automated wireless network set-up technique. Alternatively, the operating system 106 may include one or more components for implementing the automated wireless network set-up technique. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD- ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 124 such as keyboard, mouse, pen, voice input device, touch input device, etc. Output device(s) 126 such as a display, speakers, printer, etc. may also be included. These devices are well know in the art and need not be discussed at length here.

Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
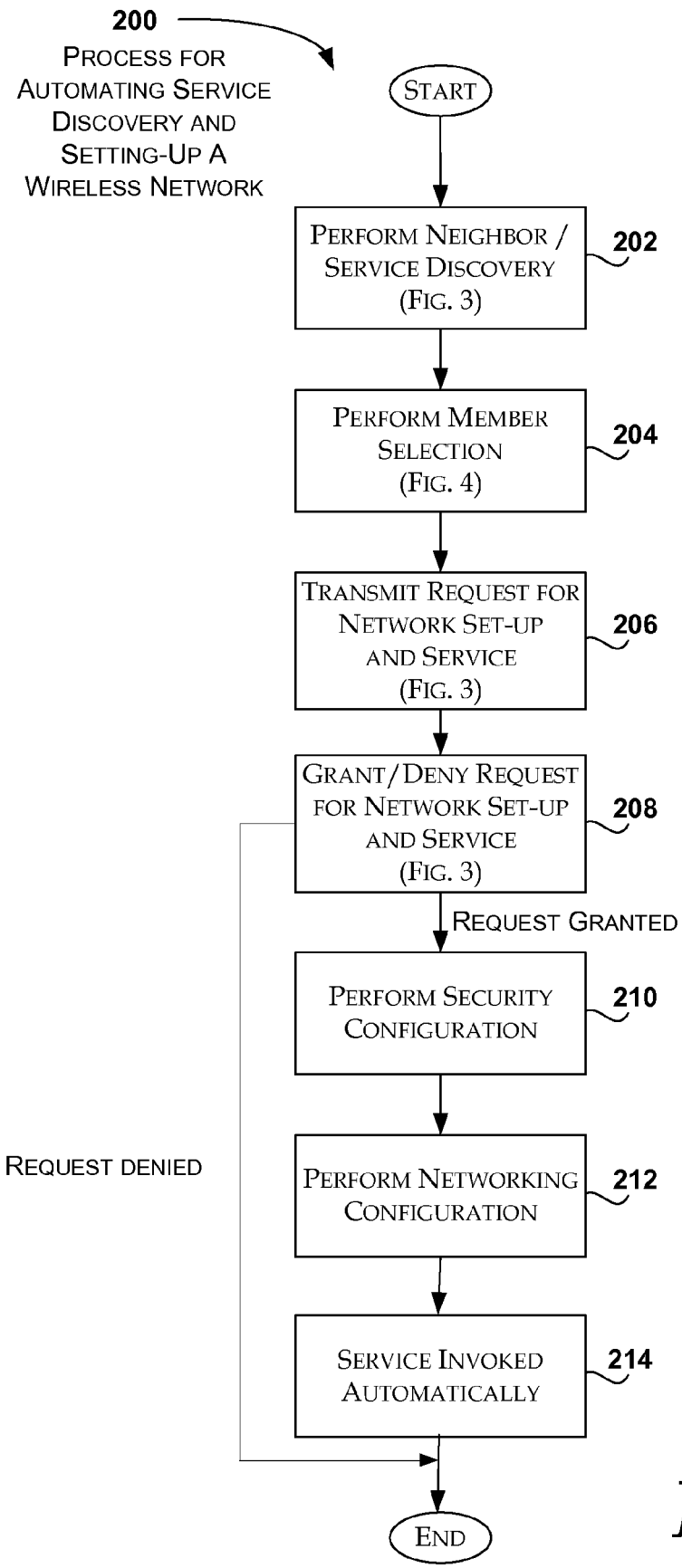
FIG. 2 is flow diagram illustrating an overview of an exemplary process that automates service discovery and set-up of a wireless network.

FIG. 2 is flow diagram illustrating an overview of an exemplary process for automating service discovery and setting-up a wireless network. Process 200 begins at block 202 where neighbor and service discovery is performed. Briefly, described in detail later in conjunction with FIG. 3, neighbor/service discovery is performed automatically using periodic broadcasts sent from nearby computing devices. The periodic broadcasts are encoded with special beacon signals. The computing device that desires wireless service/connectivity collects the beacons to determine the wireless devices that are nearby, the types of services provided by the nearby devices, and the mode(s) supported by each of the nearby devices. Once the computing device determines the nearby wireless devices, the types of services available, and the modes supported, processing continues at block 204.

Figure 4:
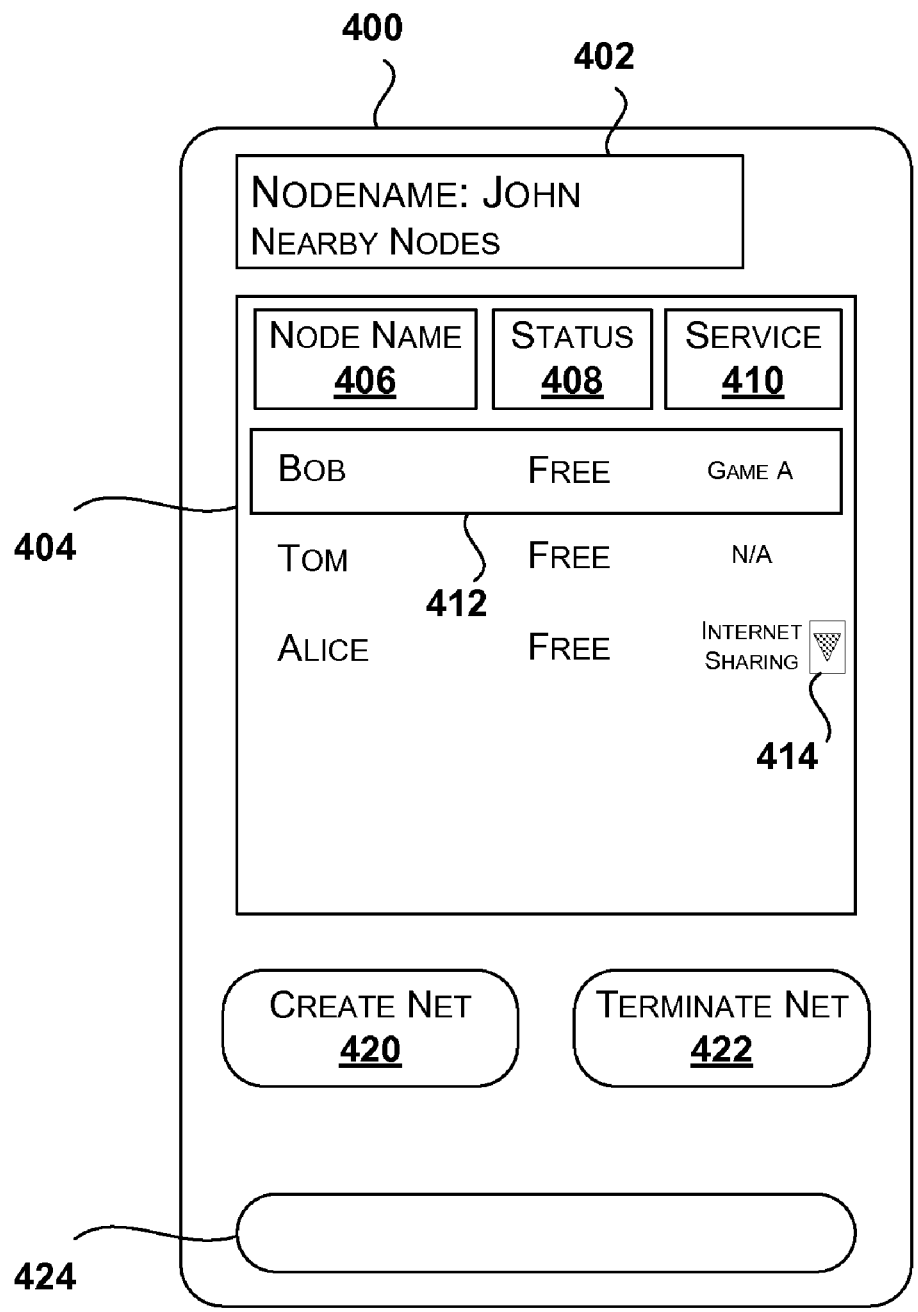
FIG. 4 illustrates one exemplary graphical user interface for the present automated wireless service discovery and network set-up technique.

At block 204, member selection is performed. In one embodiment, the member selection may be performed via a graphical user interface. FIG. 4 illustrates one exemplary graphical user interface for performing member selection. Each of the available wireless devices, along with its provided services, may be displayed in the graphical user interface. The user who wishes wireless service/connectivity may then select one or more of the available wireless devices that are displayed. Each available wireless device is associated with a specific user. Once the desired users are selected, the selected users are identified as "members." Processing continues at block 206.

Figure 5:
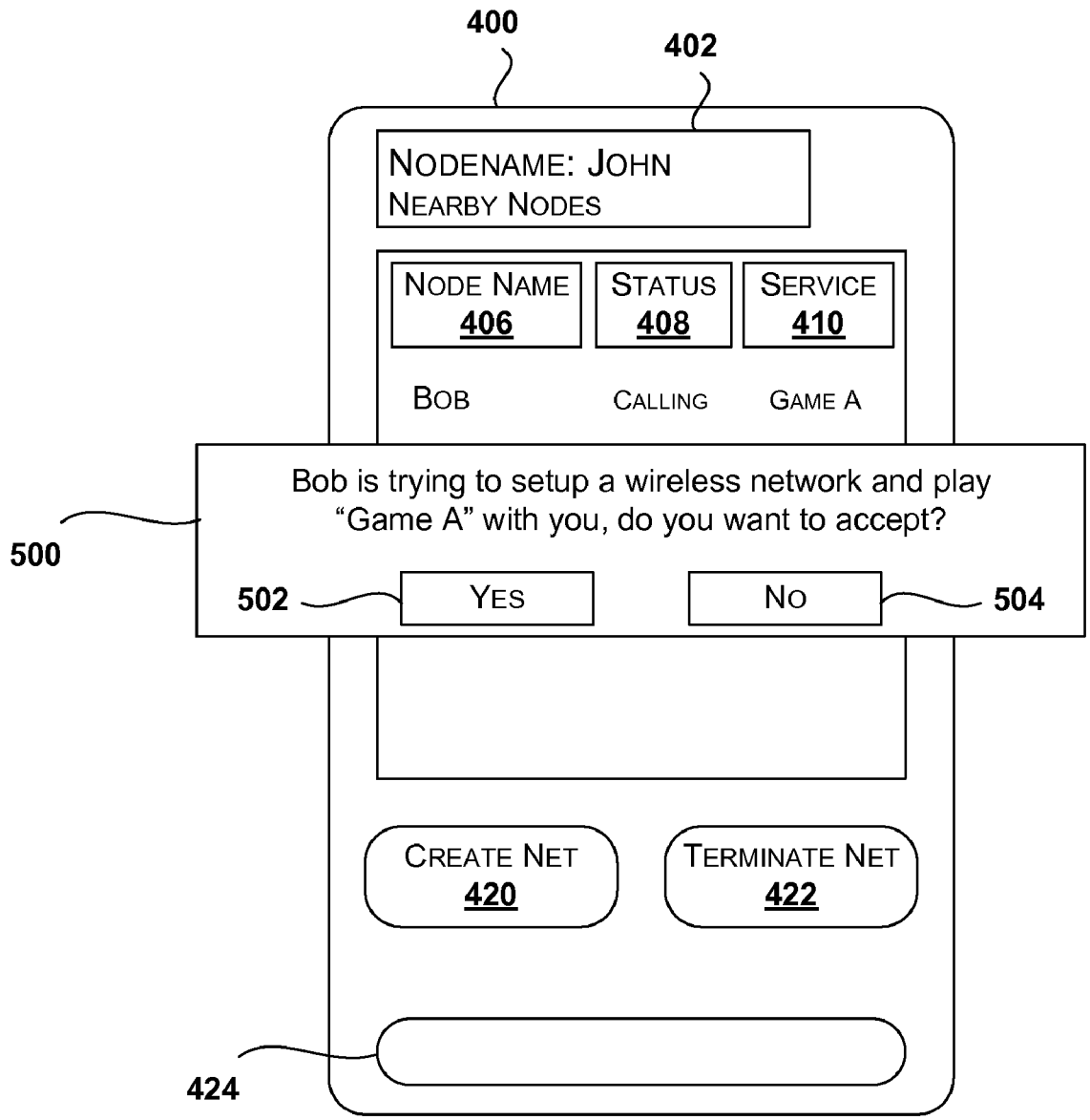
FIG. 5 illustrates an exemplary pop-up window for the graphical user interface shown in FIG. 4.

At block 206, the user who wishes wireless service/connectivity (hereinafter referred to as the network initiator) transmits a network set-up request from his corresponding computing device (hereinafter referred to as the initiating computing device) to the computing device(s) (hereinafter referred to as invited computing devices) associated with the selected member(s) (hereinafter referred to as the invitees). The network set-up/service request is described in conjunction with FIG. 3. Briefly, the network set-up/service request involves specifying an available mode, specifying a host name, and identifying the type of request. In addition, FIG. 5 illustrates an example communication between two computing devices that become connected wirelessly using the present automated wireless service discovery and network set-up mechanism. Processing continues at block 208.

At block 208, upon receiving the network set-up request, each invited computing device may either grant the request or deny the request. This determination may be based on wireless settings (e.g., radio mode, channel) obtained from the request or based on other criteria. In general, if the grant is denied, processing proceeds to the end of process 200 for that particular invited computing device. The grant may be denied by simply ignoring the request. If the invited computing device desires to grant the request, the invited computing device determines the validity of the network set-up request. The validity of the network set-up and service request may include checking whether the invitee was actually identified as an invitee in the network set-up request, whether the invitee has the service desired by the inviter, and whether the invitee wishes to join the wireless network. If the network set-up request is valid and the invitee wishes to join, the invited computing device grants the network set-up/service request by setting its beacon to correspond to the beacon of the initiating device. Again, the network set-up request grant is described in conjunction with FIG. 3 and described in conjunction with an example communication between two computing devices illustrated in FIG. 5. Processing continues at block 210.

At block 210, security related configuration is exchanged between the initiating device and the invited device(s). The automation of the security related configuration may rely on existing technologies, such as authentication, key distribution, Wireless Equivalent Protocol (WEP), WiFi Protected Access (WPA) selection, or the like. The security related configuration includes authentication and key distribution. The authentication process may be based upon a pre-shared key, public/private keys, or public key infrastructure (PKI). After authentication succeeds, the session key used to encrypt the data packets may be negotiated based upon the procedures specified in WEP, WPA, and/or Institute of Electrical and Electronic Engineers (IEEE) 802.11. Processing continues at block 212.

At block 212, network configuration is performed automatically. Like the automation of security related configuration, the automation for the network configuration may rely on existing technologies. The network configuration includes choosing an IP address for each computing device and specifying a routing protocol for the wireless network. In one embodiment, the IP address for each computing device may be obtained by hashing the host name. An IP address conflict detection scheme may then be applied if necessary. In another embodiment, the network initiator may act as a DHCP server and assign IP addresses for the wireless devices on the network. The selection of the routing protocol may be performed in a manner whereby each device pre-agrees on a routing protocol, such as AODV, DSR, and the like. Processing continues at block 214.

At block 214, the service desired by the initiating device may be automatically invoked. The desired service may be an Internet Connection Sharing service, an on-demand ad hoc meeting, a peer-to-peer network game, a file sharing service, a combination of several services, or no service. Process 200 is then complete.

Once these steps have been completed, the automated wireless network set-up is completed. Services and/or applications may then be run on the wireless network smoothly. As described, the above process allows users with limited understanding or skill with network or wireless technology the ability to set-up a wireless network. Therefore, with the automated wireless set-up technique, small offices, home offices, and individuals can easily set-up wireless networks. In so doing, on-demand ad hoc meetings, peer-to-peer wireless gaming, file sharing, and other scenarios may be more easily implemented using the above described process.

Figure 3:
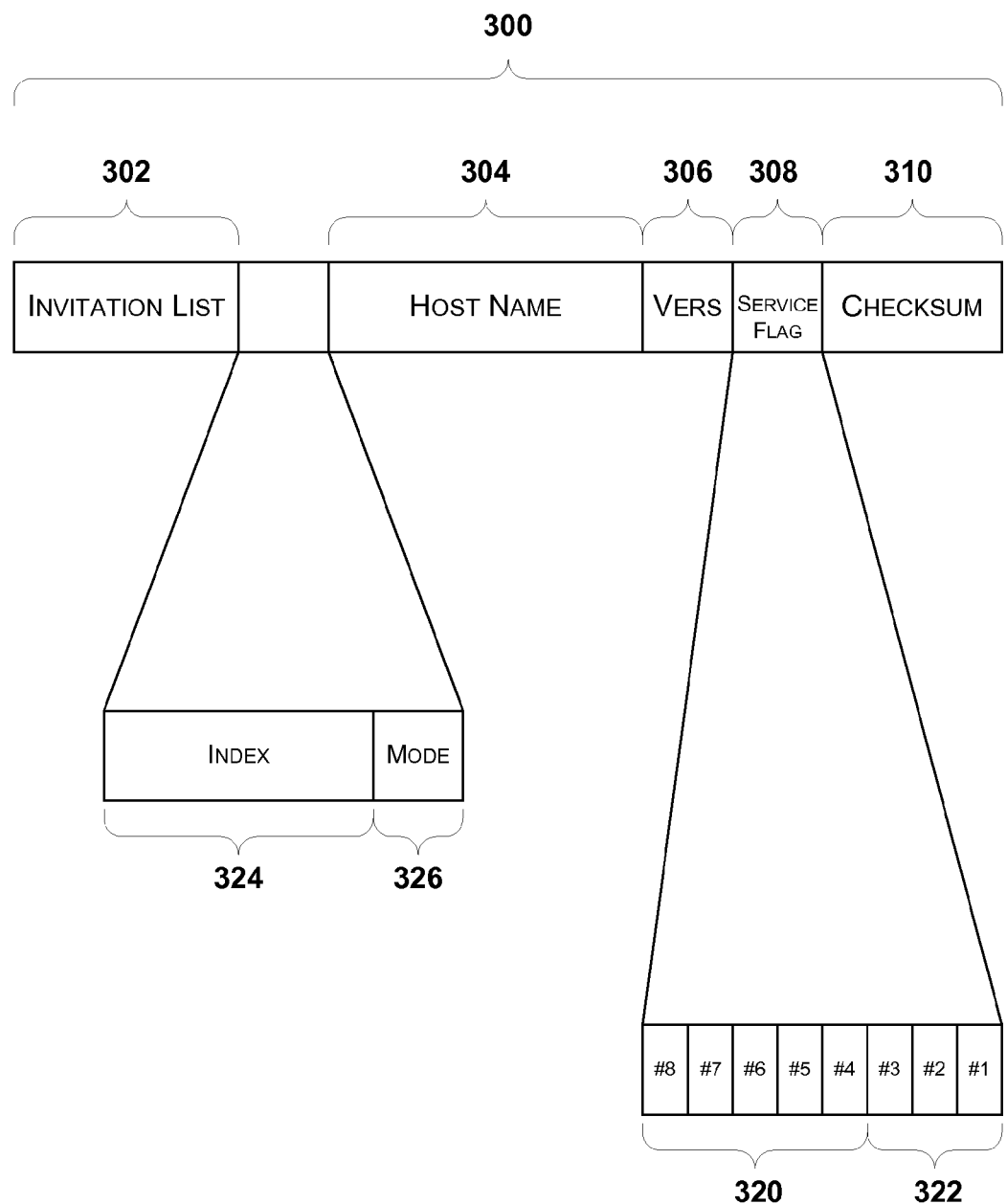
FIG. 3 is a graphical depiction of a special beacon signal used for neighbor and service discovery and for network set-up.

FIG. 3 is a graphical depiction of a special beacon signal used to discover neighbors and services, send requests for network set-up, and send grants for network set-up. In one embodiment, the special beacon signal used in the present automated wireless service discovery and network set-up technique is based on the IEEE 802.11 standard. In accordance with the IEEE 802.11 standard, a device compliant with the 802.11 standard periodically broadcasts signals if the device is in ad hoc mode. Ad hoc mode refers to a mode which does not have a master or a slave. In contrast, an infrastructure mode utilizes an access point which is the master and each wireless device is connected as a slave to the access point. According to the 802.11 standard, the beacon signal includes a name for the network in which the computing device is connected and radio information of the computing device. The name for the network is denoted as a Service Set ID (SSID) and is thirty-two bytes in length. The radio information for the device may include a channel number (i.e., radio frequency), 802.11a/b/g, and a mode (e.g., infrastructure or ad hoc), and other information. A nearby device who can overhear the beacons will thus become aware of the wireless configurations of the wireless device broadcasting the corresponding beacon. In addition, the wireless configurations of the wireless device may be obtained by performing a probing process triggered by an IEEE 802.11 compliant device by initiating an active scan process. For additional information about the active scan process, one is directed to the IEEE 802.11 standard itself.

The present automated wireless service discovery and network setup technique encodes special information within a beacon signal that automates the service discovery and setting-up of a wireless network among two or more devices. In one embodiment in which the special beacon conforms to the IEEE 802.11 standard, the special information 300 is encoded within 32 bytes of SSID. In another embodiment, the special information may be encoded in a customized Information Element (IE) in the broadcasting beacon. The special information 300 includes an invitation list field 302, a host name field 304, a service flag field 308, and a checksum field 310. In addition, the special information may include a version field 306, an index field 324, and/or a mode field 326. Each of these fields is described in more detail below. As one skilled in the art will appreciate, the actual length of each field and the order of each field in the beacon may be altered without departing from the present automated wireless discovery and network set-up technique. In addition, any other format for a beacon signal may be used by encoding that beacon signal format with the special information. As long as the initiating wireless device and the invited wireless device understand the format for each field, the present technique will operate to automatically discover service and set-up an automated wireless network between two or more computing devices.

The invitation list field 302 identifies invitees for the wireless network. In one embodiment, the invitation list field consumes nine bytes. In order to accommodate multiple invitees, a "Bloom Filter" technique may be used to compact the multiple host names into the specified bytes for the invitation field. For additional information about the "Bloom Filter" technique, one is invited to read an April 2004 article by M. Ceglowski entitled "Using Bloom Filters" available at http://www.perl.com/pub/a/2004/04/08/bloom_filters.html. In a further refinement of the present technique, index field 324 may be used to reduce the "false positives" that are introduced by using the Bloom Filter. This refinement is discussed below in conjunction with the index field 324. Other compression techniques may also be used to invite more devices using the limited number of bytes. As will be described below when discussing service flag field 308, the invitation list field 302 and the service flag field 308 are used in conjunction. For example, in one embodiment, if a bit in the flag field 308 is set to a value of 1, the invitation list field identifies one or more invitees with whom the initiating device would like to form a wireless connection.

The host name field 304 stores an identifier for the device broadcasting the beacon. This allows the device to declare its presence. In addition, it allows nearby devices to automatically discover and identify the device sending the special beacon. In one embodiment, the host name field consumes eighteen bytes.

The service flag field 308 indicates which service or services the wireless device can provide. It also indicates whether the initiating device wishes to automatically launch the service(s) after the wireless network has been setup. Services include file transfer, game playing, and the like. In one embodiment, service flag field 308 consumes one byte where some of the bits (e.g., bits 320) may be reserved for additional future services. The remaining bits are used to specify the service that is desired and are referred to as service bits 322. When the first bit of the service flag byte is set to zero, the device sending the beacon is declaring only its presence and not requesting any service. In this case, the remaining bits of the service flag byte indicate the services that could be provided by this wireless device. When the first bit of the service flag byte is set to a value of one, the device sending the beacon is requesting invitee(s) to form a wireless network together. In this case, the remaining bits of the service flag byte indicate that the initiating device would like to invoke some service(s) with the invitees after the wireless network has been setup. The invitee(s) will be specified in the invitation list field as described above. When the second bit of the service flag is set to a binary value of "1", the device sending the beacon is requesting invitee(s) to form a wireless network together and requesting to transfer files to the invitee(s). When the third bit of the service flag is set to "1", the device sending the beacon is requesting invitee(s) to form a wireless network together and requesting to play a game with the invitee(s). Multiple bits of the service flag could be set to 1 at the same time to indicate that the initiating device would like to invoke multiple services with the invitees. As one skilled in the art will appreciate, the actual implementation of the service bits maybe modified without departing from the scope of the present automated wireless discovery and network set-up technique.

The version field 306 may be used for various purposes. For example, version field 306 may be used as a "timestamp" for each special beacon having the same "Host Name". This timestamp may then be used to determine which of two beacons transmitted from the same host is valid. For example, it may be possible that a computing device may find that some of its neighboring computing devices are beaconing two special beacons simultaneously. This may occur if one computing device requests another computing device to form a wireless network to play a game and then later requests two other computing devices, not including the one requested to play the game, to form a network. The previous beacon received by nearby wireless devices may stay in their "cache" for quite a while. When that happens, upon receiving the new beacon, it may appear that the computing device is broadcasting two different beacons. To overcome this problem, the recipient of any beacon may use the version field to compare multiple beacons having the same name for the host name field 304. The recipient will then determine which beacon is valid (or the latest) based on the timestamp. In one embodiment, the version field 306 consumes one byte.

The checksum 310 may be used to validate that the received beacon is from a wireless device knowledgeable about the present automated wireless network set-up technique. In one embodiment, checksum field 310 consumes two bytes and a wireless device implementing the present technique performs a Cyclic Redundancy Check (CRC) on the other bytes (e.g., 30 bytes) to generate a checksum which can be compared with the value stored in checksum field 310. The present technique may use other checksum generation techniques to generate the checksum without departing form the present technique.

The index field 324 may be used to reduce the "false positives" introduced using the Bloom Filter. "False positives" correlate to wireless devices that were not actually invited by the inviter but become listed within the invitation list after the Bloom Filter is applied. The Bloom Filter was introduced by Burton H. Bloom in 1970. The Bloom Filter represents n elements (also called keys) in a bit vector to support membership check-up. The basic operation of the Bloom Filter is to compute k hash values given a key X (e.g., the Host Name). The k hash values range from 1 to m. The filter then sets k bits in a bit-vector with m bit length at the bit positions corresponding to the k hash values. This repeats until all the remaining n-1 keys are set into the bit vector. The Bloom filter verifies whether a key X' has been input into the bit vector by using the same k hash functions to generate k hash values. If all the bits at the k locations corresponding to the k hash values in the bit-vector are set, X' is believed to have been input into the Bloom Filter. The false positive rate $P_f$ of a Bloom Filter 1 can be computed using $P_f=(1-e^{-nk/m})^k$. Therefore, given that the invitation list is nine bytes (72 bits), a Bloom Filter with 4 hash functions would have a false positive rate around 20% if the number of elements n equals to 20. This means that the network initiator would invite 20 devices to form a wireless network where every five invitations could possibly contain a false invitation.

Figure 7:
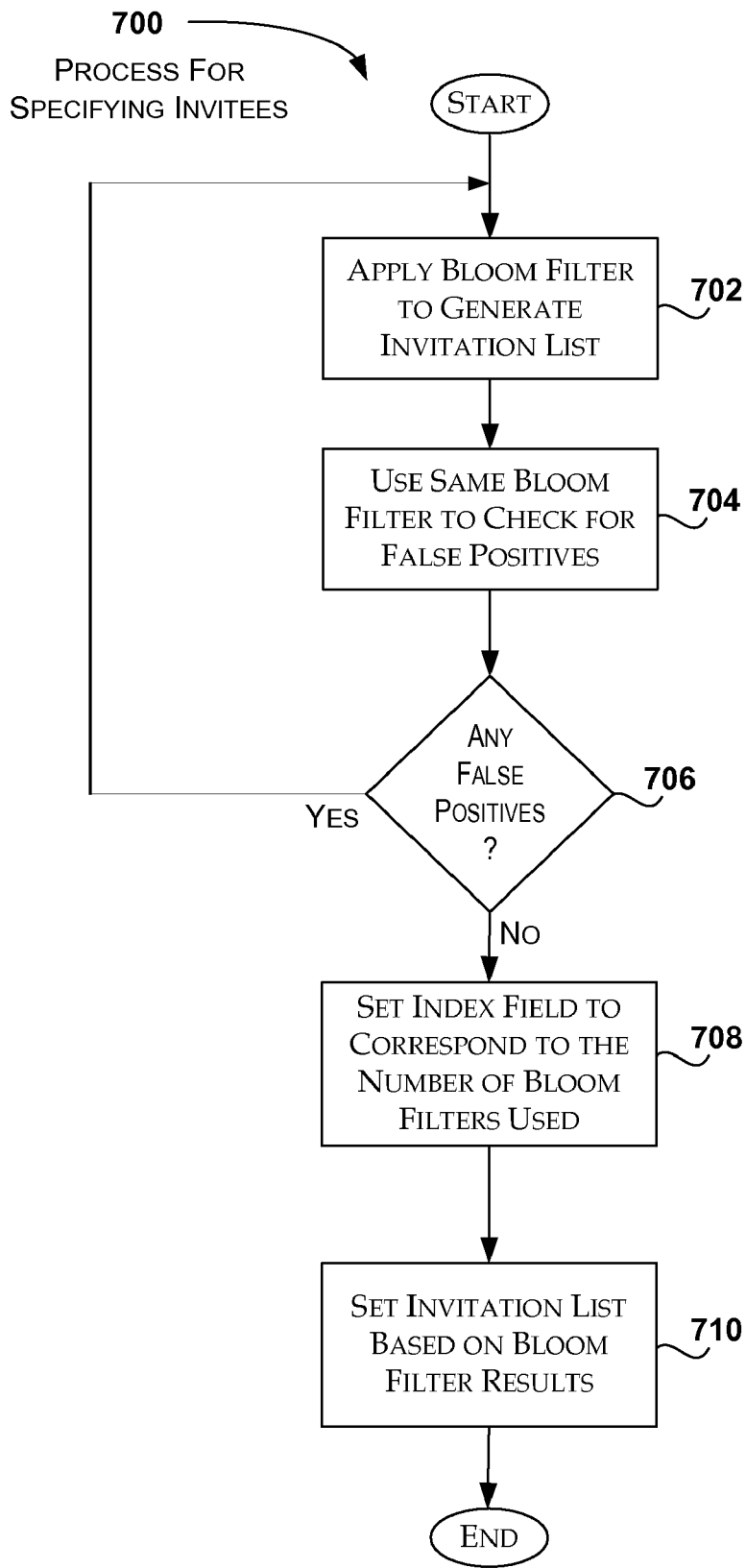
FIG. 7 is a flow diagram illustrating a process for specifying invitees in the invitation list using Bloom Filters.

Thus, the present refinement uses multiple Bloom Filters to reduce the false positive rate. FIG. 7 is a flow diagram illustrating the process for specifying the invitees in the invitation list. The process 700 begins at block 702, where a Bloom Filter is applied for all the selected computers to be invited. Processing continues at block 704.

At block 704, the Bloom Filter applied in block 702 is used to check for false positives. Because the network initiator knows each of the host names to be invited and all the host names of the wireless devices in the neighborhood, the network initiator can use the same Bloom Filter to check whether the invitation list falsely invites any of the wireless devices in the neighborhood that should not be invited. Processing then continues to decision block 706.

At decision block 706, a determination is made whether there were any false positives identified. If there are any false positives, the process loops back to block 702 where another Bloom Filter is used. Thus, blocks 702 and 704 are repeated until there are no longer any false invitations. Each time block 702 is performed, another Bloom Filter with different k hash functions but the same m length of the bit vector is used to generate the invitation list in the invitation list field. Once there are no longer any false positives determined at decision block 706, the process continues at block 708.

At block 708, the index field 324 is set to correspond to the number of Bloom Filters used. In one embodiment, the index field 324 may have six bits to identify different Bloom Filters. The binary value in the field indicates the index of the Bloom Filter used for the invitation list. For example, if the index field 324 contains a binary value of "000100", this denotes that the invitation list is generated by the 4$^{th}$ Bloom Filter. All the previous three Bloom Filters contained one or more false positives. Processing continues at block 710.

At block 710, the invitation list is set based on the outcome of the Bloom Filters. The process is then complete. Using the 6 bits of the index field 324 to calculate the false positive rate $P_f$ results in $P_f=(P_l)^{64}$. Using 4 hash functions, if a network initiator invites 50 devices to join a network, the false positive rate is 1.8e−45. Thus, the present refinement greatly reduces the false positive rate.

Mode field 326 identifies one or modes in which the wireless device may operate. In one embodiment, the mode may include one of the 802.11 modes, such as 802.11a, 802.11b, 802.11 g. Some computing devices may be capable of operating in all of the modes at separate times, while other computing devices may be only capable of operating in one mode. Computing devices that operate in the 802.11a mode operate in a spectrum around 5 GHz and can support up to 54 Mbps data rate. Computing devices that operate in the 802.11b mode operate in a spectrum around 2.4 GHz and can support up to 11 Mbps data rate. Computing devices that operate in the 802.11 g mode operate in a spectrum around 2.4 GHz and can support up to 54 Mbps data rate. Some computing devices can support multiple modes. Each supported mode is then designated. For example, a 802.11b/g computing device may operate in either the b or g mode. The computing devices must be able to communicate in the same spectrum and both support the same data rate in order for them to communicate with each other.

In one embodiment, the mode field 326 may be two bits to allow the devices to declare their communication capability. This capability is then broadcasted along with the Host Name when the device is declaring its presence to allow discovery by nearby devices. For example, binary "00" may indicate that the device can only support "b" mode, binary "01" may indicate that the device can support "b/g" mode, binary "10" may indicate that the device can support "a" mode, and binary "11" may indicate that the device can support "a/b/g" modes. The network initiator then uses this information to choose a mode so that each of the invited devices can communicate.

FIG. 8 is a table 800 illustrating an exemplary negotiation policy for selecting a mode for communicating between two or more wireless computing devices. Table 800 illustrates six example test cases 802-812 from which other test cases can be deduced by analogy. For each test case, Table 800 identifies two devices (e.g., 1 and 2) and identifies which mode (e.g., mode a, mode b, or mode g) the device operates within using an "X". If a device can operate in multiple modes (e.g., 802.11b/g mode device), an "X" is placed in each mode that the device can operate.

Test case 802 illustrates Device 1 as an 802.11a device and Device 2 as an 802.11b/g device. Because 802.11a devices can not talk with 802.11b/g devices, the Selected Mode column indicates "No Mode Available". For this case, assuming the network initiator is Device 1, the network initiator will be unable to discover Device 2 because they operate in different spectrums.

Test case 804 illustrates Device 1 as an 802.11b/g device and Device 2 as an 802.11b device. The Selected Mode column indicates "Mode b". Likewise, Test case 806 illustrates Device 1 as an 802.11a/b/g device and Device 2 as an 802.11b device. The selected Mode column again indicates "Mode b" as the compatible mode for communicating between devices having these mode capabilities.

Test case 808 illustrates Device 1 as an 802.11a/b/g device and Device 2 as an 801.11a device. The Selected Mode column indicates "Mode a" as the compatible mode.

Test case 810 illustrates Device 1 and Device 2 as both 801.11/a/b/g devices. While these devices can select any of the modes to communicate, the negotiation policy recommends the 802.11a mode because it is faster than the 802.11b mode. In addition, the 802.11a mode is recommended over the 801.11 g mode because the 802.11a mode may suffer less interference (and hence higher throughput) because the 5 Ghz spectrum for the 802.11a mode may have less interference than the 2.4 Ghz spectrum for the 802.11 g mode. The 2.4 Ghz spectrum is more likely to have interference because it is the spectrum in which 802.11b devices operate and 802.11b devices are very prevalent. In addition, many other types of devices also operate in the 2.4 Ghz spectrum, such as microwave ovens and the like. Thus, the Selected Mode column indicates "Mode a" as the compatible mode.

Test case 812 illustrates Device 1 and Device 2 as both 802.11b/g devices. While these devices can select either of these modes to communicate, the negotiation policy recommends the 802.11 g mode because the 802.11 g mode is faster than the 802.11b mode. While Table 800 illustrates only two devices involved in the negotiation policy, one skilled in the art can easily extrapolate the above described negotiation policy to handle multiple wireless devices. After the network setup initiator decides the mode based on the negotiation policy of Table 800, the network setup and service request is sent in the spectrum determined by the selected mode.

FIG. 4 illustrates one exemplary graphical user interface (GUI) 400 for the present automated wireless service discovery and network set-up technique. GUI 400 may include an identity area 402 where the node name for the associated computing device is displayed. FIG. 4 illustrates "John" as the node name. GUI 400 includes a neighbor list window 404. The neighbor list window is split into three columns. One column includes a node name header 406, the second column includes a status header 408, and the third column includes a service header 410. Each of the computing devices along with the services that they provide is displayed on one row in the neighbor list window 404. The first column lists the node name associated with the discovered computing device; the second column lists the status (e.g., free, calling, etc.) for the associated computing device; and the third column lists the service(s) provided by the associated computing device. If the computing device provides one service, the name of that service appears in the third column, such as "Game A". If the computing device provides multiple services, a drop-down arrow 414 may appear on the graphical user interface 400 which when activated lists the names of each of the multiple services.

GUI 400 also includes a selection means for selecting one or more of the node names displayed in the neighbor list window 404. The selection means includes positioning a cursor to select the node name, a text entry area where a portion of the node name may be entered, a physical button on the computing device that sequentially highlights each of the displayed node names so that the desired node names can then be selected, a checkbox, or the like. In FIG. 4, Bob is illustrated within block 412 to represent that Bob has been selected. Once all of the node names that are desired have been selected, the user may select a create network means. The create network means may include a Create Net button 420, a physical button on the computing device, or the like. The Create Net button initiates the sending of the request for network set-up discussed above in conjunction with FIGS. 2 and 3. The GUI 400 may also be used to terminate a wireless network by selecting one or more members in the neighbor list window and selecting a terminate net button 422. GUI 400 may also include a status area 424 where information about the status of a wireless connection may be displayed. For example, a file may be dragged onto one of the members listed in the neighbor list window to transfer that file to that member. The status area 414 may then display the status for this file transfer.

FIG. 5 illustrates one exemplary pop-up window 500 associated with graphical user interface (GUI) 400. The pop up window 500 notifies the invitee that the initiating user would like to setup a network and invoke some service(s) with him/her. The invitees can grant or deny the request by clicking the "Yes" button 502 or "No" button 504.

Figure 6:
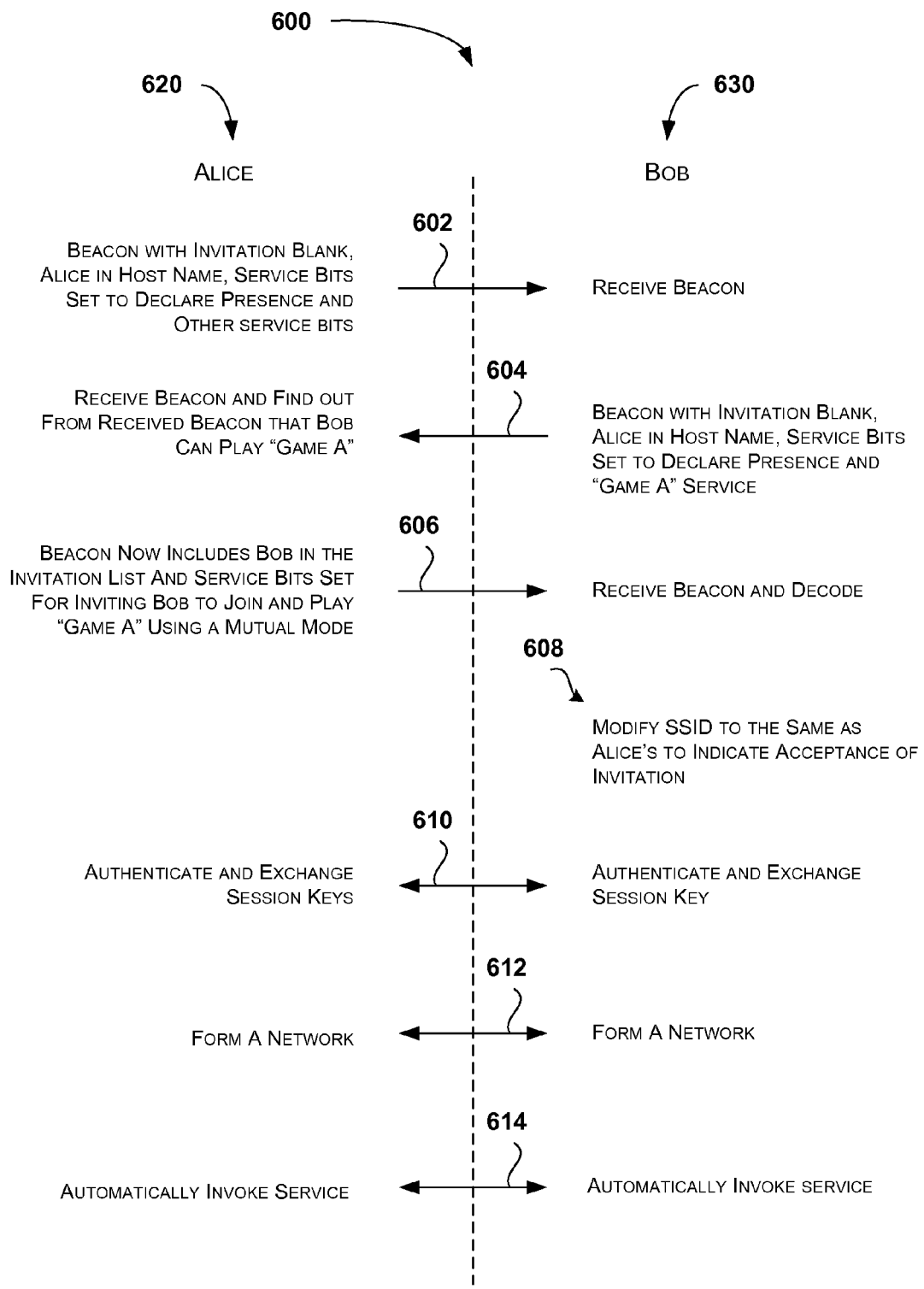
FIG. 6 is a sequential time diagram illustrating a process for connecting two wireless computing devices in accordance with the present automated wireless service discovery and network set-up technique.

FIG. 6 is a sequential time diagram illustrating a process 600 of connecting two wireless computing devices (e.g., Alice 620 and Bob 630). At step 602, the computing device associated with Alice sends out a beacon declaring its presence and its provided services. Thus, the beacon will have the invitation list field blank, "Alice" in the host name field, the service bits set for declaring its presence and its provided services, and its mode set to reflect its available modes. Likewise, at step 604, the computing device associated with Bob sends out a beacon declaring its presence, its services (e.g., "Game A"), and its mode. This beacon identifies "Bob" in the host name field. When Alice receives this beacon, she finds out that Bob could play "Game A". At step 606, "Alice" sends a beacon that includes "Bob" and "Alice" in the invitation list field and the service bits 322 set to "101" to indicate that it is an invitation to Bob to setup a network with Alice and play "Game A". In addition, the beacon has the mode specified so that "Alice" and "Bob" can communicate using the best available mutual mode. "Bob" receives the beacon and decodes the beacon. At step 608, "Bob" modifies his SSID to the same as Alice's, thereby, indicating his acceptance of the invitation when the beacon is transmitted. Because Bob's and Alice's SSID are the same, their corresponding devices automatically begin authentication and set-up. At step 610, "Alice" and "Bob" authenticate and exchange session keys. Once authentication and the exchange of session keys is completed, "Alice" and "Bob" form a network at step 612. At step 614, "Game A" may be invoked automatically right after the network has been set up.

While FIG. 6 illustrates a process for connecting two wireless computing devise, one skilled in the art will appreciate that multiple computing devices may be connected and multiple services may be invoked using the present automated wireless service discovery and network set-up technique. For example, if Alice invited Bob and John (not shown), Alice would send a beacon that included Alice, Bob, and John in the invitation list. If Bob and John accept, each changes the SSID to the same as Alice's. Then, for the duration of the network, each field in the SSID remains the same, even if one of the invited devices does not join the network. In the embodiment where the special information is encoded within Information Elements included in the broadcasting beacon, the invitation list may change since the SSID does not change with the invitation list or any other field in the IE.

While example embodiments and applications have been illustrated and described, it is to be understood that the invention is not limited to the precise configurations and resources described above. Various modifications, changes, and variations apparent to those skilled in the art may be made in the arrangement, operation, and details of the disclosed embodiments herein without departing from the scope of the claimed invention. For example, the host name field, invitation list field, service flag field, and/or other information may be encoded in some customized Information Elements in the beacon signal that are not part of the SSID. These information elements may then be included in the beacon signal broadcasted by wireless devices.

What is claimed is:

1. A computer-implemented method for automating service discovery and set-up of a wireless network, the method comprising:
   performing, at a first computing device, neighbor and service discovery by searching for a special beacon transmitted from one or more second computing devices, the special beacon comprising at least a host name that identifies each of the one or more second computing devices from which the special beacon is broadcasted;
   performing, at the first computing device, member selection to select one or more of the second computing devices from each of which the special beacon is received and identified; and
   transmitting, from the first computing device, a network set-up and service request for initiating a connection with the one or more selected second computing devices to establish a wireless network, the network set-up and service request identifying and inviting each of the one or more selected second computing devices to become a member of the wireless network and asking each of the invited second computing devices to invoke a service as specified in the request after the network has been set-up, wherein the network set-up and service request and the special beacon conform to an IEEE 802.11 standard.

2. The computer-implemented method of claim 1, further comprising receiving, at the first computing device, another special beacon from the one or more of the selected second computing devices each indicating a grant of the network set-up and service request.

3. The computer-implemented method of claim 2, wherein the network set-up and service request and the special beacon have a same format.

4. The computer-implemented method of claim 2, further comprising performing security configuration with each of the one or more selected second computing devices that grants the request.

5. The computer-implemented method of claim 4, further comprising performing network configuration with each of the one or more selected second computing devices that grants the request.

6. The computer-implemented method of claim 1, wherein performing member selection is via a graphical user interface which displays each of the one or more second computing devices along with available services associated with the one or more second computing devices.

7. The computer-implemented method of claim 1, wherein the network set-up and service request specifies a type of service that is requested by the first computing device.

8. The computer-implemented method of claim 1, wherein the network set-up and service request specifies a mode that is compatible for communicating with the one or more selected second computing devices.

9. The computer-implemented method of claim 8, wherein the mode is determined using a negotiation policy that factors in a spectrum and a data rate capability for each of the one or more selected second computing devices and for the first computing device that sends the network set-up and service request.

10. The computer-implemented method of claim 9, wherein the network set-up and service request is transmitted in a selected spectrum determined by the negotiation policy.

11. A computer-readable storage medium having stored thereon a data structure, the data structure being converted from a wireless transmission signal transmitted from a first computing device for initiating a connection with a second computing device to set-up a wireless network and invoke one or more desired services, the data structure comprising:
    a host name field wherein a host name for a host computing device, the host name identifying the first computing device that sends a request by transmitting the wireless transmission signal;
    an invitation list comprising an identifier for a second computing device requested to become a member of the wireless network; and
    a service flag field wherein service bits are stored for specifying one or more services desired to be invoked after the wireless network between the first and the second computing devices is set-up,
    wherein the wireless network conforms to an IEEE 802.11 standard.

12. The computer-readable storage medium of claim 11, wherein the identifier within the invitation list comprises a hash of name for the invited computing device.

13. The computer-readable storage medium of claim 12, wherein the hash is computed using a Bloom Filter.

14. The computer-readable storage medium of claim 11, wherein the one or more desired services include at least one from a set comprising file transfers, peer-to-peer gaming, ad hoc meeting, and network set-up.

15. The computer-readable storage medium of claim 11, wherein when the service bits are set in a pre-determined manner, the data structure declares the host computing device's presence and the services provided by the second computing device to the host computing device.

16. The computer-readable storage medium of claim 11, further comprising a version field wherein a timestamp is stored.

17. The computer-readable storage medium of claim 11, further comprising a checksum field wherein a checksum is stored for validating the data structure.

18. The computer-readable storage medium of claim 11, further comprising an index field for storing a value that indicates a Bloom Filter index that resulted in the invitation list having no false positives.

19. The computer-readable storage medium of claim 11, further comprising a mode field for indicating a communication capability.

20. A computing device, comprising:
a processor;
a memory into which a plurality of instructions are loaded, the plurality of instructions performing a method when executed by the processor, the method comprising:
displaying at a received computing device a hostname for each of a plurality of host computing devices from which a beacon is received, wherein displaying is via a graphical user interface;
providing a selection means on the graphical user interface for selecting at least one of the host computing devices; and
providing a create network means on the graphical user interface that, when activated, results in a transmission of a network set-up request to establish a wireless network between the received computing device and the selected host computing device, the network set-up request identifying each of the selected host computing devices and inviting each of the selected host computing devices to become a member of the wireless network, wherein the wireless network conforms to an IEEE 802.11 standard.

21. The computing device of claim 20, wherein the network set-up request further identifies a type of service among the members of the wireless network.

22. The computing device of claim 20, wherein the graphical user interface further includes a status area for displaying information about each of the host computing devices.

23. The computing device of claim 20, wherein the selection means comprises a selectable text block for highlighting each of the host computing devices to be selected.

24. The computing device of claim 20, wherein the create network means comprises a button.

* * * * *